United States Patent
Toi et al.

(10) Patent No.: US 10,411,530 B2
(45) Date of Patent: Sep. 10, 2019

(54) ROTATING ELECTRIC MACHINE

(71) Applicants: Kabushiki Kaisha Toshiba, Minato-ku (JP); TOSHIBA INDUSTRIAL PRODUCTS AND SYSTEMS CORPORATION, Kawasaki-shi (JP)

(72) Inventors: Takahiro Toi, Minato-ku (JP); Minoru Awazu, Minato-ku (JP); Nobutaka Akiura

(73) Assignees: KABUSHIKI KAISHA TOSHIBA, Minato-ku (JP); TOSHIBA INDUSTRIAL PRODUCTS AND SYSTEMS CORPORATION, Kawasaki-shi (JP)

(*) Notice: Subject to any disclaimer, the term of this patent is extended or adjusted under 35 U.S.C. 154(b) by 219 days.

(21) Appl. No.: 15/281,839

(22) Filed: Sep. 30, 2016

(65) Prior Publication Data

US 2017/0093238 A1    Mar. 30, 2017

(30) Foreign Application Priority Data

Sep. 30, 2015 (JP) .................................. 2015-193656

(51) Int. Cl.
   *H02K 1/16* (2006.01)
   *H02K 3/28* (2006.01)
(52) U.S. Cl.
   CPC ................ *H02K 1/16* (2013.01); *H02K 3/28* (2013.01); *H02K 2213/03* (2013.01)
(58) Field of Classification Search
   CPC .................................... H02K 1/16; H02K 3/28
   See application file for complete search history.

(56) References Cited

U.S. PATENT DOCUMENTS

| | | | | | |
|---|---|---|---|---|---|
| 3,324,322 | A | * | 6/1967 | Johns ....................... | H02K 3/28 310/198 |
| 4,271,380 | A | * | 6/1981 | Bradler .................. | D06F 37/304 310/133 |
| 4,402,129 | A | * | 9/1983 | Kreuzer .................... | H02K 3/28 29/596 |
| 5,018,676 | A | * | 5/1991 | Gulbrandson ........... | H02K 3/28 242/433 |
| 5,691,590 | A | * | 11/1997 | Kawai ...................... | H02K 3/18 310/180 |

(Continued)

FOREIGN PATENT DOCUMENTS

| CN | 102611231 A | 7/2012 |
|---|---|---|
| JP | 8-275422 | 10/1996 |
| JP | 10-28346 | 1/1998 |

OTHER PUBLICATIONS

Office Action dated Feb. 19, 2019, in Chinese Patent Application No. 201610857498.2.

(Continued)

*Primary Examiner* — Robert W Horn
(74) *Attorney, Agent, or Firm* — Oblon, McClelland, Maier & Neustadt, L.L.P.

(57) ABSTRACT

A rotating electric machine of one embodiment includes a stator provided with a stator core having windings of each pole of each phase lap wound thereto; and a rotor provided rotatably with respect to the stator. The stator core is provided with slots each having two or more parallelly connected windings of equal turns count inserted therein.

1 Claim, 10 Drawing Sheets

(56) References Cited

U.S. PATENT DOCUMENTS

| | | | | |
|---|---|---|---|---|
| 5,955,810 | A * | 9/1999 | Umeda | H02K 1/165 310/201 |
| 5,994,802 | A * | 11/1999 | Shichijyo | H02K 1/325 310/254.1 |
| 6,388,357 | B1 * | 5/2002 | Tokumasu | H02K 3/28 310/198 |
| 6,417,592 | B2 * | 7/2002 | Nakamura | H02K 3/12 310/184 |
| 6,552,463 | B2 * | 4/2003 | Oohashi | H02K 3/12 310/184 |
| 6,812,610 | B2 * | 11/2004 | Kim | H02K 3/28 310/180 |
| 6,825,589 | B2 * | 11/2004 | Kouda | H02K 3/28 310/201 |
| 6,969,938 | B2 * | 11/2005 | Seguchi | H02K 3/28 310/180 |
| 6,979,926 | B2 * | 12/2005 | Ogawa | H02K 3/12 310/179 |
| 7,619,344 | B2 * | 11/2009 | Osawa | H02K 23/28 310/198 |
| 7,808,145 | B2 * | 10/2010 | Taguchi | H02K 23/30 310/179 |
| 7,812,497 | B2 * | 10/2010 | Sugishima | H02K 23/36 310/179 |
| 8,936,211 | B2 * | 1/2015 | Yamaguchi | H01F 41/06 242/432.5 |
| 9,077,216 | B2 * | 7/2015 | Koga | H02K 3/12 |
| 9,172,280 | B2 * | 10/2015 | Koga | H02K 3/12 |
| 9,425,666 | B2 * | 8/2016 | Ishigami | H02K 3/12 |
| 2014/0042862 | A1 * | 2/2014 | Ishigami | H02K 3/12 310/187 |
| 2014/0215806 | A1 * | 8/2014 | Yamaguchi | H02K 15/068 29/596 |
| 2014/0346914 | A1 * | 11/2014 | Funasaki | H02K 3/28 310/198 |
| 2015/0042196 | A1 * | 2/2015 | Awazu | H02K 3/12 310/198 |
| 2015/0249369 | A1 * | 9/2015 | Ko | H02K 3/28 310/201 |
| 2016/0204683 | A1 * | 7/2016 | Nordstrom | H02K 3/28 310/166 |
| 2017/0033619 | A1 * | 2/2017 | Tamura | H02K 1/16 |
| 2017/0093238 | A1 * | 3/2017 | Toi | H02K 3/28 |
| 2017/0264173 | A1 * | 9/2017 | Koga | H02K 3/04 |
| 2017/0366115 | A1 * | 12/2017 | Akutsu | H02P 27/06 |

OTHER PUBLICATIONS

Office Action dated Feb. 26, 2019, in Japanese Patent Application No. 2015-193656.

Combined Office Action and Search Report dated Jul. 4, 2018 in Chinese Patent Application No. 201610857498.2.

* cited by examiner

| INSERTING METHOD | INSERTED IN ONE TIME | DIVIDED | |
|---|---|---|---|
| | | DIVIDED BASED ON TURNS COUNT | DIVIDED BASED ON CONDUCTOR GROUP |
| DIVISION OF WINDING | NONE | 6 CONDUCTORS × 10 TURNS + 6 CONDUCTORS × 10 TURNS = 120 CONDUCTORS | 3 CONDUCTORS × 20 TURNS + 3 CONDUCTORS × 20 TURNS = 120 CONDUCTORS |
| TOTAL COUNT OF COIL CONDUCTORS (WHEN TOTAL COUNT IS 120) | 6 CONDUCTORS × 20 TURNS = 120 CONDUCTORS | | |
| CONNECTING METHOD OF DIVIDED COILS | - | SERIES CONNECTION | PARALELL CONNECTION |
| COUNT OF COIL END CONNECTION SITES | 12 | 24 | 12 |
| POSSIBILITY OF VARIATION IN CROSS-SECTIONAL AREA | - | NOT POSSIBLE | POSSIBLE |

FIG.2

ROTATING ELECTRIC MACHINE

CROSS-REFERENCE TO RELATED APPLICATION(S)

This application is based upon and claims the benefit of priority from Japanese Patent Application No. 2015-193656 filed on, Sep. 30, 2015 the entire contents of which are incorporated herein by reference.

FIELD

Embodiments of the present invention relate to a rotating electric machine.

BACKGROUND

In patent publication JP H10-28346 A for example, two coils in which the turns count has been reduced to half of the original turns count are inserted one after another into the stator slot of a rotating electric machine in two rows, namely the first row located in the outer diameter side and the second row located in the inner diameter side. Though not explicitly disclosed in the publication, it is presumed that the first row coil and the second row coil are series connected. As a result, the number of end-to-end connection of the coils is increased which causes an increase in manufacturing cost.

BRIEF DESCRIPTIONS OF THE DRAWINGS

FIG. 1 pertains to a first embodiment and schematically illustrates how the coil ends are connected when a conductor group of the U phase coil is divided in two.

FIG. 2 is a chart providing a comparison of: a coil being inserted into the slot in one time; coils inserted into the slot after being divided in two based on turns count; and a configuration according to one embodiment.

Figure 4:
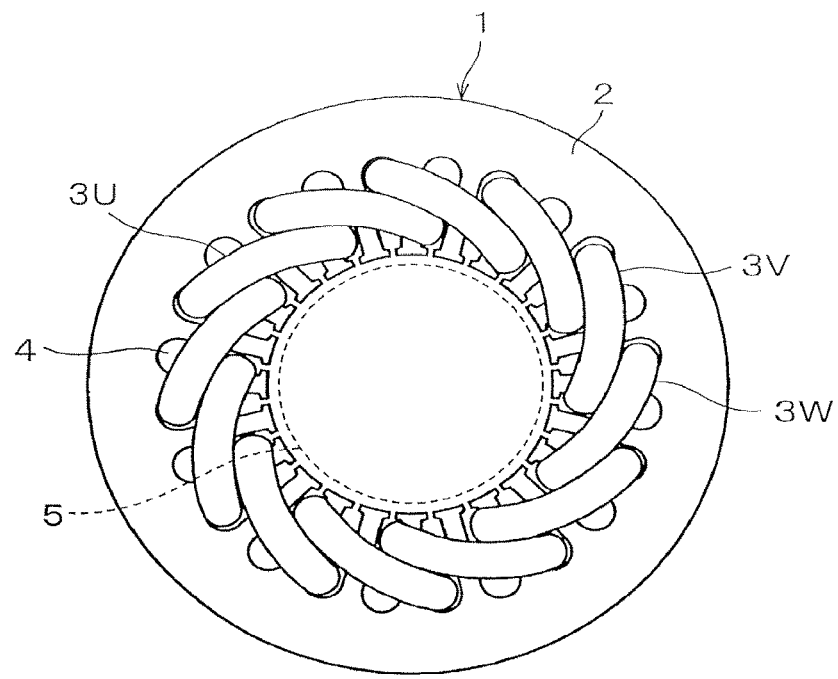

FIG. 4 pertains to the conventional configuration and is a plan view of a stator in which the coils are inserted in one time.

Figure 5:
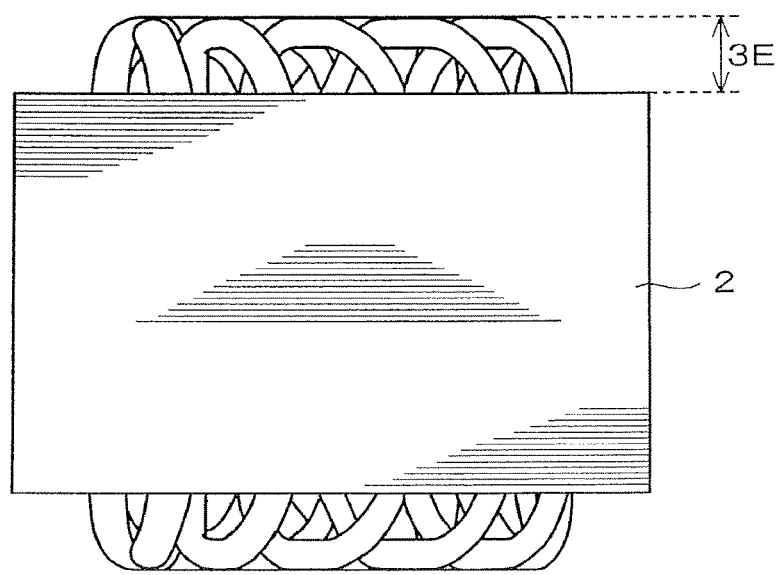

FIG. 5 is a side view of the stator.

Figure 6:
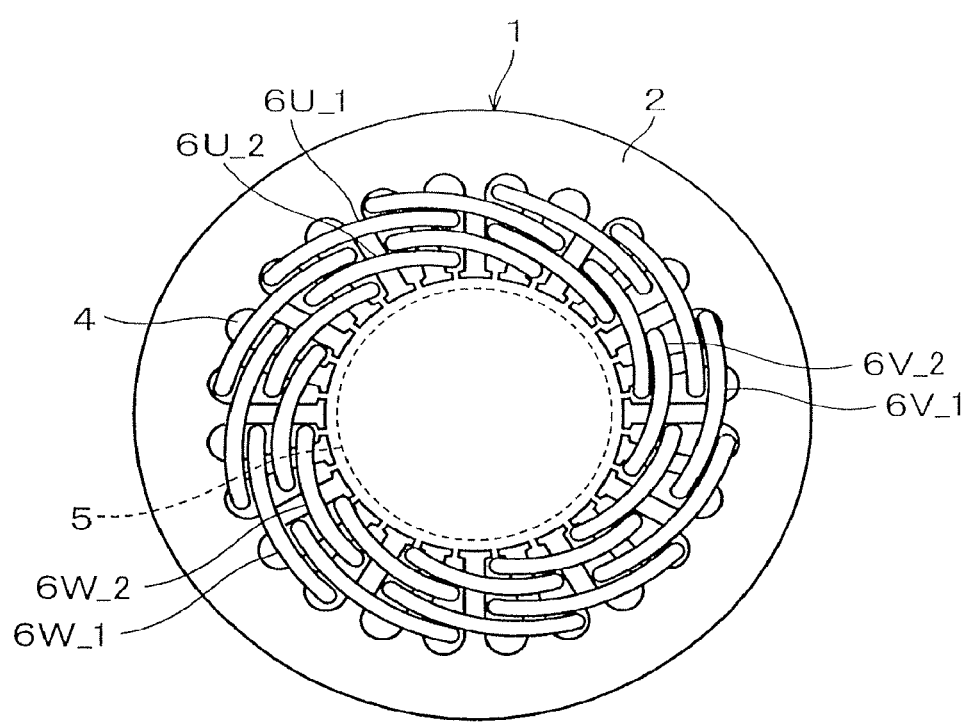

FIG. 6 pertains to the conventional configuration and is a plan view of a stator in which a coil to be inserted into the same slot is inserted after being divided in two based on turns count.

Figure 7:
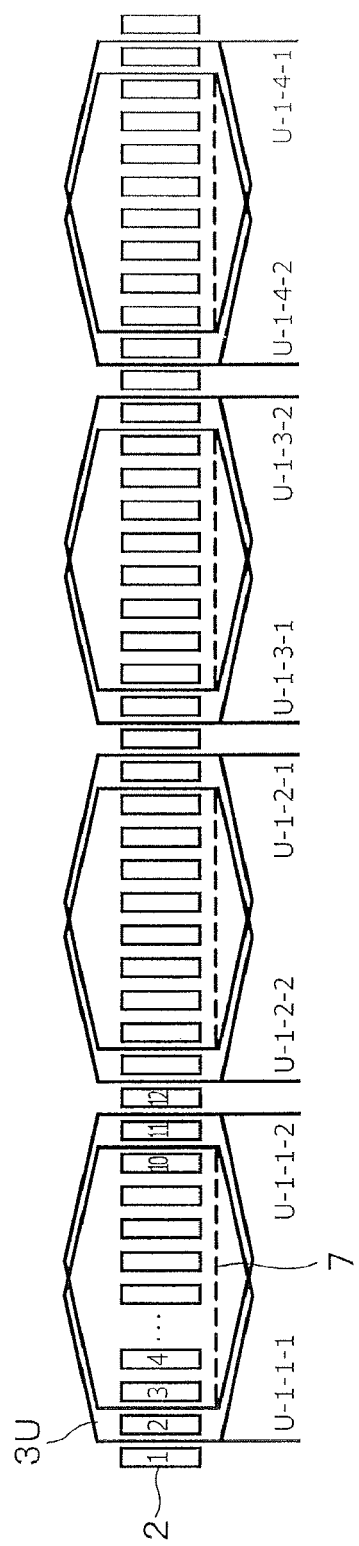

FIG. 7 is a development view illustrating the stator coils of FIG. 4 being wound in the slot.

Figure 8:
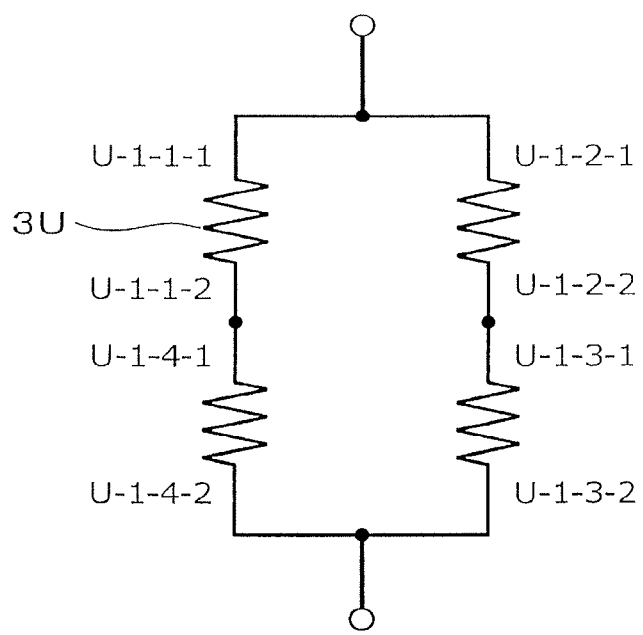

FIG. 8 schematically illustrates how ends of the coils illustrated in FIG. 7 are connected.

Figure 9:
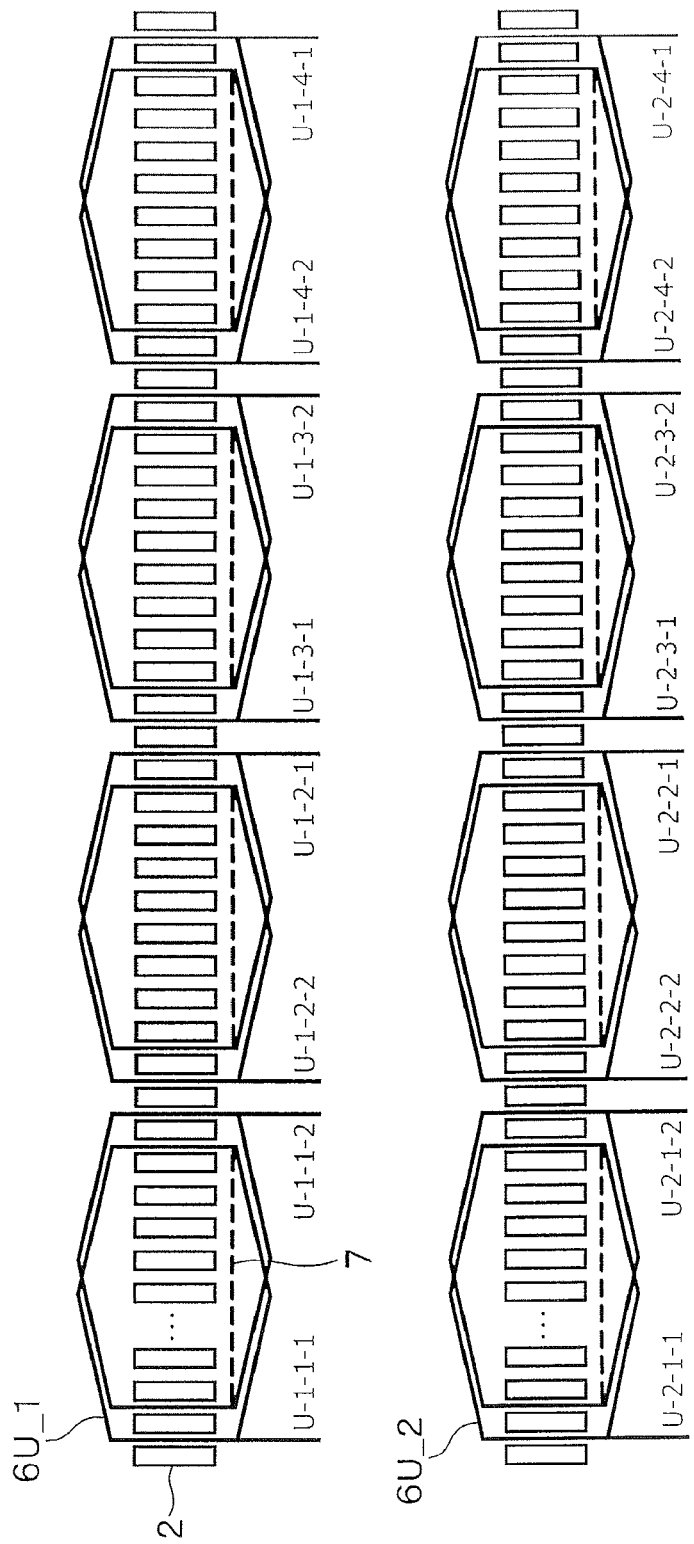

FIG. 9 is a development view illustrating the stator coils of FIG. 6 being wound in the slot.

Figure 10:
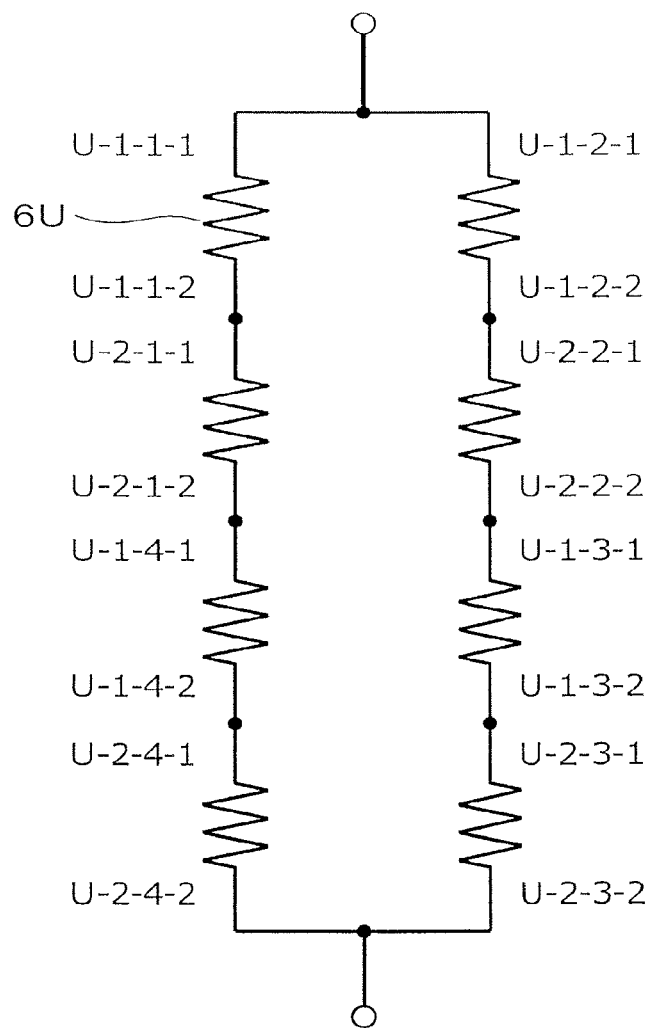

FIG. 10 schematically illustrates how ends of the coils illustrated in FIG. 9 are connected.

Figure 1:
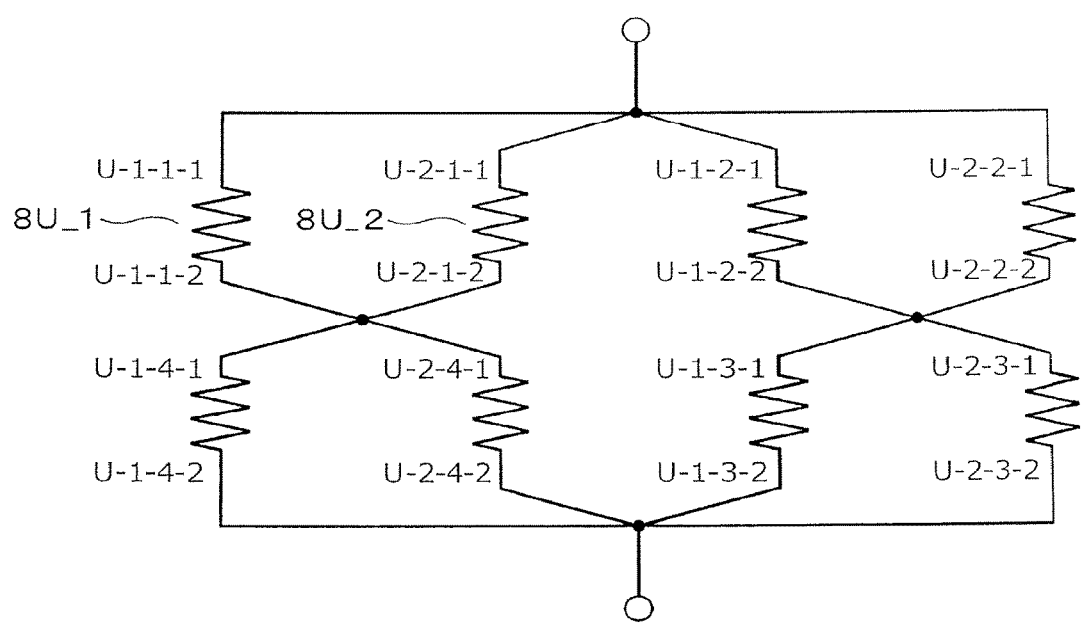
Figure 11:
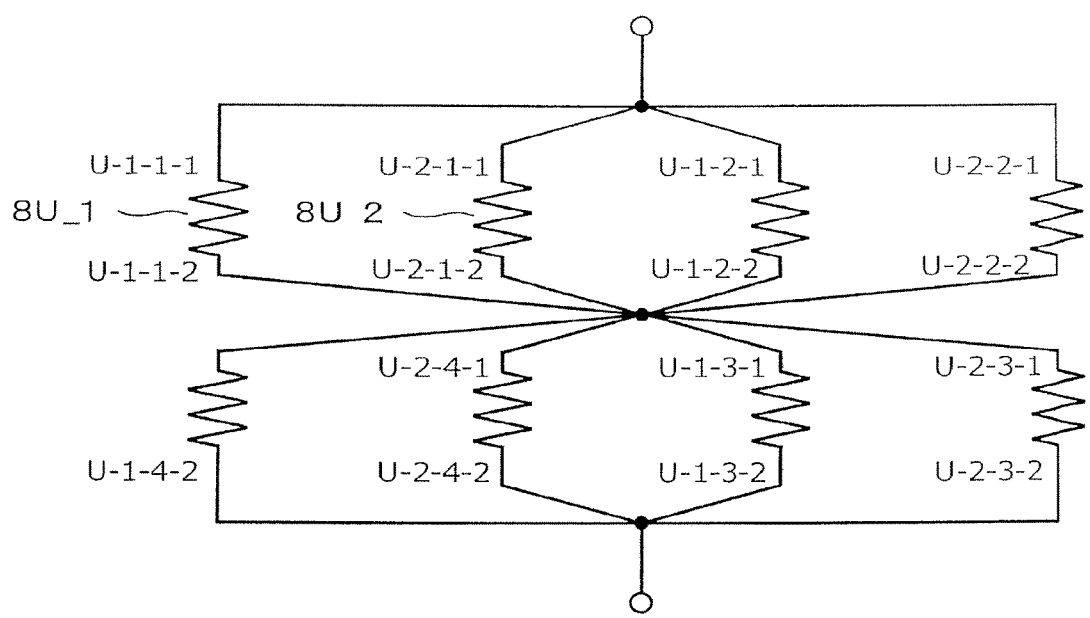

FIG. 11 corresponds to FIG. 1 and illustrates a modified example.

DESCRIPTION

The present disclosure provides a rotating electric machine capable of preventing an increase in the number of end-to-end connection of the windings when a distributed winding is employed.

In one embodiment, a rotating electric machine includes a stator provided with a stator core having windings of each pole of each phase lap wound thereto; and a rotor provided rotatably with respect to the stator; the stator core provided with slots each having two or more parallelly connected windings of equal turns count inserted therein.

One embodiment is described with reference to the accompanying figures. The description will start from the conventional structure to clarify the differences between the structure of the present embodiment and the conventional structure. FIG. 4 is a plan view of a stator wound by a lap winding method which is one form of distributed winding. FIG. 5 is a side view of the stator illustrated in FIG. 4. A stator 1 is provided with a stator core 2, a U-phase coil (winding) 3U, a V-phase coil 3V, and a W-phase coil 3W. Each coil is wound like a whorl and disposed inside a slot 4.

The rotating machine is an inner-rotor type and a rotor 5 illustrated in a broken line is disposed in the hollow portion of the stator core 2. Characteristics of the present embodiment exist in the structure of the stator 1 and hence, the rotor 5 will not be described in detail.

Each of the coils 3U to 3W is a wound bundle of multiple conductors, for example, a wound bundle of a group of conductors in which copper wires are bundled together. The coils 3U to 3W are disposed in the slots 4 in a wound state. Because the above described structure requires increased amount of copper wires when the coils are placed into the slots 4, it takes time and effort in manually inserting the coils into the slots 4. Even when the coils are placed in the slots 4 using a machine, increased amount of stress is exerted on the copper wires which may damage the coating of the copper wires and cause degradation of insulation reliability. Similar problem may occur in the molding step in which coil ends 3E (see FIG. 5), which are portions of the coils exposed at the end faces of the stator core 2, are spread radially outward after the coils are inserted into the slots 4. The coils become increasingly rigid as the number of copper wires become greater. As a result, the height of the coil ends 3E become higher to increase the amount of copper wires used.

FIG. 6 corresponds to FIG. 4 and illustrates a case when the coil to be inserted into each slot 4 is divided in two based on turns count as described in the aforementioned patent publication. Because coil to be stored into the same slot 4 are inserted separately in two different timings (6_1 and 6_2), the amount of copper wires being stored in one time is reduced. As a result, it becomes easier to insert the coils and mold the coils while securing insulation reliability and reducing the amount of copper wires being used by reducing the height of the coil ends.

However, when the coil is divided based on turns count, it is required to series connect the divided coils 6_1 and 6_2 being inserted into the same slot 4 in order to provide the same level of motor properties provided when the coil is inserted into the slot 4 in one time. As greater number of coil ends need to be connected in such case, it takes greater amount of time to connect the coils.

FIG. 7 is a schematic development view of the U-phase winding 3U being placed in the slots 4 of the stator of a general three-phase motor having 4 poles and 48 slots as illustrated in FIG. 4. As two coils 3U are wound consecutively, the ends of the two coils 3U are connected by a connecting wire 7 indicated by a broken line in FIG. 7. More specifically, coil 3U being placed between teeth number 1 and 2 of the stator core 2 and between teeth number 10 and 11 is formed first. Then, coil 3U, connected to the previous coil 3U via the connecting wire 7, is formed which is placed between teeth number 2 and 3 and between teeth number 11 and 12. As a result, the two consecutive coils form a single coil having two coil ends. The two consecutive coils are considered as a single coil in the following description.

The series of symbols U-A-B-C (such as U-1-1-1) in the figures represent U: U phase, A: number of rows, B: coil number, and C: coil end number. The number of rows of coils in a general lap wound configuration illustrated in FIG. 4 is one, and thus, there are four U-phase coils having a total of eight coil ends. FIG. 8 is a diagram illustrating how the coil ends of the U-phase windings are connected. The dots indicated in FIG. 8 represent locations where the coil ends need to be connected by welding, etc. There are four connection sites for the U-phase winding and thus, there area total of twelve connections sites for the three phases.

FIG. 9 corresponds to FIG. 7 when the coil is divided in two based on turns count as illustrated in FIG. 6. The first row coil 6U_1 and the second row coil 6U_2, being illustrated separately for convenience of explanation, are placed inside the same slot. In this case, there are eight U-phase windings having sixteen coil ends.

FIG. 10 corresponds to FIG. 8 and illustrates how the coil ends are connected in the configuration of FIG. 9. For example, suppose a coil made of a bundle of copper wire group containing six copper wires is turned twenty times. Then, such coil is divided into 2 coils each containing six copper wires and being turned ten times. In order to equalize the motor properties of a motor employing such coil arrangement with a motor in which the coil is inserted in one time, the winding end of the first row coil needs to be series connected to the winding start of the second row coil which is illustrated as a connection between U1-1-2 and U2-1-1 in FIG. 10. This amounts to a total of eight connection sites for the U phase and a total of twenty four connection sites for all three phases. This doubles the time required in connecting the coil ends of the inserted coils compared to the configuration in which the coils are inserted in one time, consequently increasing the manufacturing cost. The size of current flowing through the conductor group in the first row and the conductor group in the second row are the same when the coils are series connected. Thus, in order to balance the loss, the sum of the conductor cross-sectional area of the conductor group in the first row and the conductor group in the second row are preferably equalized.

A description will be given on the configuration of the present embodiment based on the above described background. In the present embodiment, the conductor group of the coil being placed in the same slot is divided in two and thereby dividing the coil in two in order to reduce the number of connection sites. For example, when a coil made of a bundle of a conductor group containing six copper wires and being turned twenty times is envisaged in the original design, such coil is divided into two coils each being made of a bundle of a conductor group containing three copper wires and being turned twenty times. The two divided coils establish a parallel connection and thus, the combined resistance when the coils are inserted in one time and the combined resistance when the coils are inserted separately in two different timings both remain unchanged from the originally designed value to provide the same level of motor properties.

FIG. 1 pertains to the present embodiment and corresponds to FIG. 10. By parallelly connecting the ends of the coils 8U inserted in the same slot, illustrated for example as the connection between the coil ends of U1-1-1 and U2-1-1, the number of connection sites amounts to four for the U phase and twelve for all three phases which is equal to the case when the coil is inserted in one time as illustrated in FIG. 4. This means that by employing the configuration of the present embodiment, the time expended on connecting the coils can be reduced to half of the time required in the case in which the coils are divided based on turns count.

When the coil is divided based on conductor group, i.e. the count of conductors, the turns count per coil is twice as much as the case illustrated in FIG. 6 in which the coil is divided based on turns count. However, coils are mostly manufactured by machines and requires less time to manufacture the coils compared to connecting the coils. It is thus, possible to reduce the overall time of manufacture and consequently reduce manufacturing cost.

As a result of dividing a single conductor group in two, the first row coil 8U_1 and the second row coil 8U_2 are parallelly connected as described earlier. It is thus, not required to homogenize the sum of the conductor cross-sectional area of coils 8U_1 and 8U_2. For example, six conductors may be divided into two subsets of two conductors and four conductors or two subsets of one conductor and five conductors. Further, diameters of the copper wires may vary in the first row and the second row.

Figure 3:
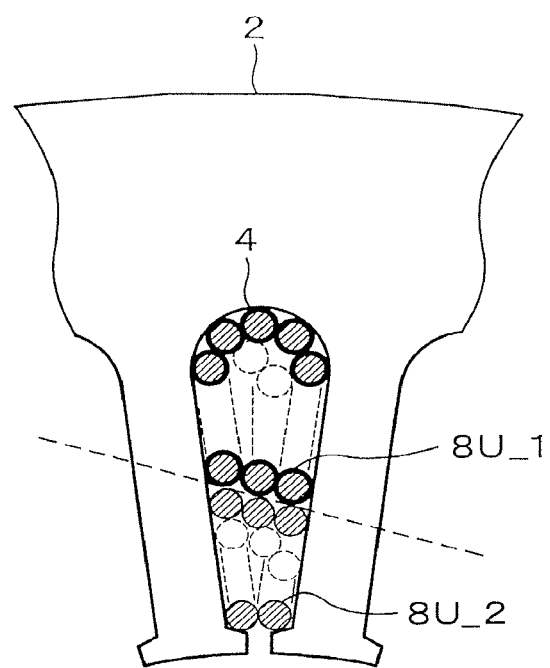
FIG. 3 is a partial cross-sectional view of a stator illustrating one example of distribution in the count of conductors of coils located in the outer diameter side and the inner diameter side.

Generally, the first row coil already exists in the slot when inserting the second row coil. Thus, increased amount of stress is applied to the second row coil when inserting and molding the second row coil. It is possible to reduce the stress applied to the second row coil by reducing the cross-sectional area of the second row coil compared to the first row coil through adjustment in the number or the diameter of conductors contained in the conductor group of the second row coil. It is possible to improve the insulation reliability of the coil by reducing the stress applied to the coil as much as possible during the insertion and molding of the coil. For example, FIG. 3 illustrates a configuration in which a total of 120 conductors are placed in the same slot. The first row coil 8U_1 is configured by turning a conductor group containing four conductors twenty times. The second row coil 8U_2 is configured by turning a conductor group containing two conductors twenty times.

When inserting an inter-phase insulation paper at the coil end portions where coils of different phases contact one another, the second row coil is generally much more difficult to work with than the first row coil since the first row coil exists on the outer peripheral side of the stator when working with the second row coil. It is much easier to insert the insulation papers in the present embodiment since it is possible to reduce the cross-sectional area of the entire coil by, for example, reducing the number of conductors used in the second row coil.

FIG. 2 is a chart providing a comparison between a configuration illustrated in FIG. 4 in which the coil is inserted in one time, a configuration illustrated in FIG. 6 in which the coil is divided in two based on turns count, and a configuration of the present embodiment in which the coil is divided based on the number of conductors forming the conductor group. Each of the three configurations are originally designed to store a total of 120 conductors in one slot. The number of connection sites of the coil ends is the smallest in the case in which the coil is inserted in one time and in the case of the present embodiment. The configuration of the present embodiment is advantageous in that the cross-sectional area of the first row coil as well as the cross-sectional area of the second row coil are variable.

According to the present embodiment, each of the coils to be inserted into each of the slots 4 of the stator core 2 are configured by parallelly connected coils 8_1 and 8_2 having equal turns count and having been divided into two subsets based on the count of conductors. It is possible to reduce the time expended on connecting the coil ends since the number of connections sites of the coil ends can be reduced. Among the parallelly connected coils, the entire cross-sectional area of the coil 8_2 disposed in the inner diameter side of the stator core 2 have been reduced compared to the entire cross-sectional area of the coil 8_1 disposed in the outer diameter side of the stator core 2. As a result, it is possible to reduce the stress exerted when inserting and molding the coil while facilitating the insertion of the inter-phase insulation paper and improving the design flexibility.

(Other Embodiments)

As illustrated in FIG. 11, it is possible to reduce the number of connection sites per phase to "3" by providing a common connection site for all of the series coils.

Other embodiments may be directed to a concentrically wound configuration instead of a lap wound configuration.

The number of coils being wound consecutively is not limited to "2".

The count of conductors in the conductor group of the second row coil need not be less than the count of conductors in the conductor group of the first row coil.

The total count of conductors as well as the count of conductors in each of the divided conductor groups may be modified according to design specifications.

The conductor group may be divided into "3" or more subsets.

The coil need not be formed of a conductor group in which multiple conductors are bundled into one. The number of conductors forming the coil maybe "1". In such case, the cross sectional area of the single conductor of the coil located in the outer diameter side may be different from the cross sectional area of the single conductor of the coil located in the inner diameter side as long as they are continuous as a conductor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotating electric machine comprising:
    a stator provided with a stator core having windings of each pole of each phase lap wound or concentrically wound thereto; and
    a rotor provided rotatably with respect to the stator;
    the stator core provided with slots each having a plurality of parallelly connected windings of equal turns count inserted therein,
    wherein each one of the plurality of parallelly connected windings has a total conductor cross-sectional area that is different from other ones of the plurality of parallelly connected windings.

\* \* \* \* \*